United States Patent [19]

Heimann

[11] Patent Number: 5,678,966

[45] Date of Patent: Oct. 21, 1997

[54] MILLING CUTTER FOR A WHEEL SET MILLING MACHINE

[75] Inventor: Alfred Heimann, Aachen, Germany

[73] Assignee: Hegenscheidt-MFD GmbH, Erkelenz, Germany

[21] Appl. No.: 555,486

[22] Filed: Nov. 8, 1995

[30] Foreign Application Priority Data

Nov. 9, 1994 [EP] European Pat. Off. .............. 94117684

[51] Int. Cl.⁶ .................................................. B23C 3/04
[52] U.S. Cl. ..................... 409/231; 82/105; 409/138; 409/180; 409/204; 409/206
[58] Field of Search ........................ 82/105; 407/11, 407/53, 56; 409/204, 213, 217, 138, 165, 199, 226, 228, 206, 231

[56] References Cited

U.S. PATENT DOCUMENTS

| | | | |
|---|---|---|---|
| 1,042,208 | 10/1912 | Egli | 409/217 |
| 2,949,065 | 8/1960 | Kulusic | 409/183 |
| 3,732,758 | 5/1973 | Rinaldo | 409/185 |
| 4,009,637 | 3/1977 | Bittner | 409/231 |
| 4,347,769 | 9/1982 | Dombrowski et al. | 82/105 |
| 4,399,724 | 8/1983 | Dombrowski | 82/8 |
| 4,494,281 | 1/1985 | Schmid | 29/6 |
| 4,552,496 | 11/1985 | Johannesson | 409/204 |
| 5,058,472 | 10/1991 | Kakko-Chiloff | 83/481 |
| 5,378,091 | 1/1995 | Nakamura | 409/136 |
| 5,405,220 | 4/1995 | Ishikawa | 409/136 |
| 5,468,100 | 11/1995 | Naim | 409/138 |

FOREIGN PATENT DOCUMENTS

| | | |
|---|---|---|
| 0167889 | 3/1951 | Austria . |
| 0489786 | 1/1930 | Germany . |
| 1179080 | 10/1964 | Germany . |
| 56-82150 | 7/1981 | Japan .................................. 409/136 |

OTHER PUBLICATIONS

Fritz Putz, Werkstattblatt 462, Gruppe E, "Fräsen IV", 1 bis 5.4.1, Carl Hanser Verlag München, 1968.

Primary Examiner—Daniel W. Howell
Assistant Examiner—Christopher Kirkman
Attorney, Agent, or Firm—W. G. Fasse; W. F. Fasse

[57] ABSTRACT

A milling cutter for truing railroad wheels has a milling drive shaft (10) with at least two, preferably three, cutter sections (3, 4, 5). One fixed cutter section (4) is rigidly connected to the shaft (10). At least one, preferably two, cutter sections (3, 5) are axially shiftable along the shaft (10) and receive their torque drive through the fixed cutter section through a releasable coupling such as a claw clutch (9, 30). One axially shiftable section (3, 5) is positioned on each side of the fixed section (4), with a gap (22) therebetween. Preferably, the shiftable sections (3, 5) are interconnected (at 21) so that an axial adjustment of one section is synchronously transmitted to the other section and vice versa.

17 Claims, 2 Drawing Sheets

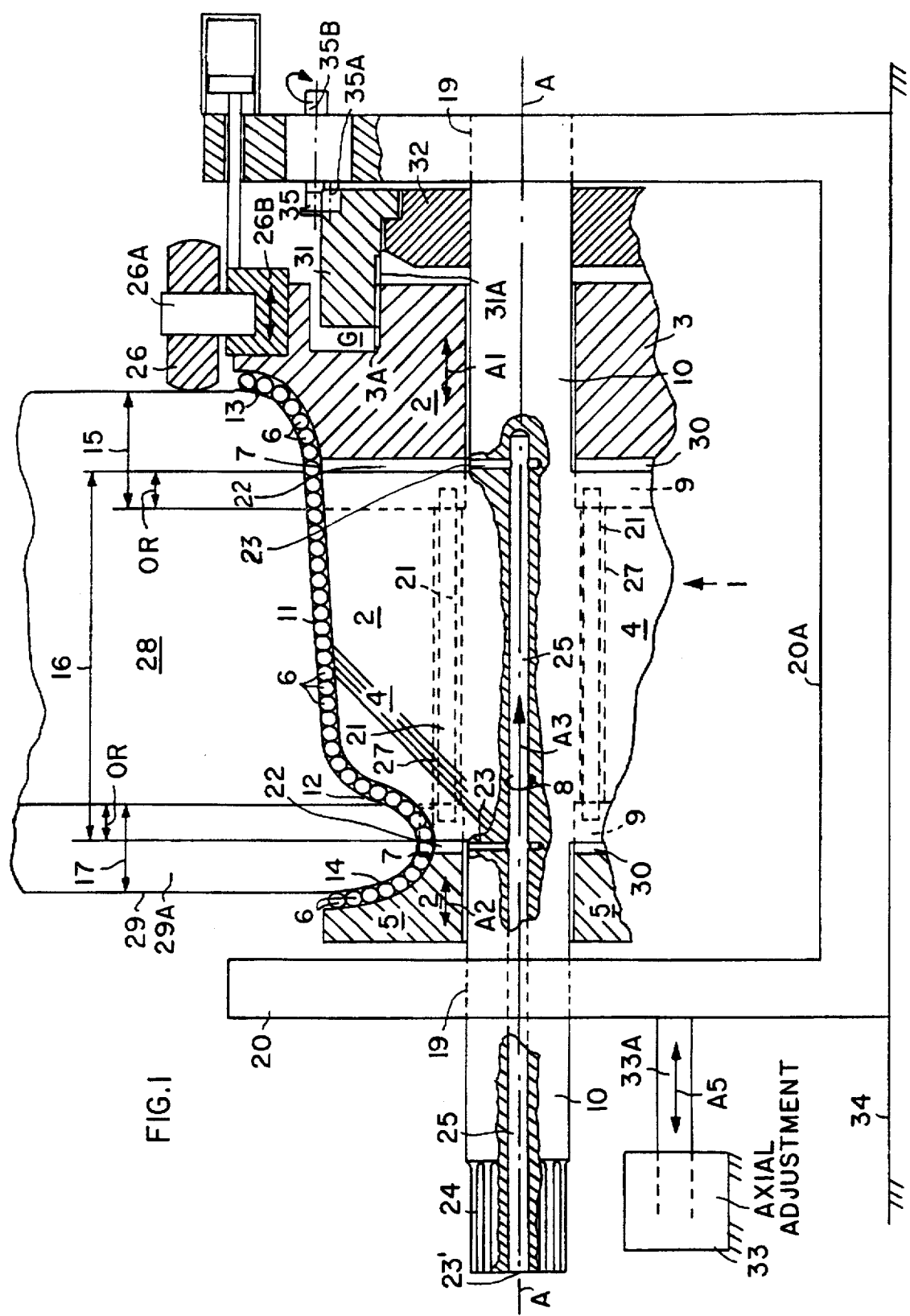

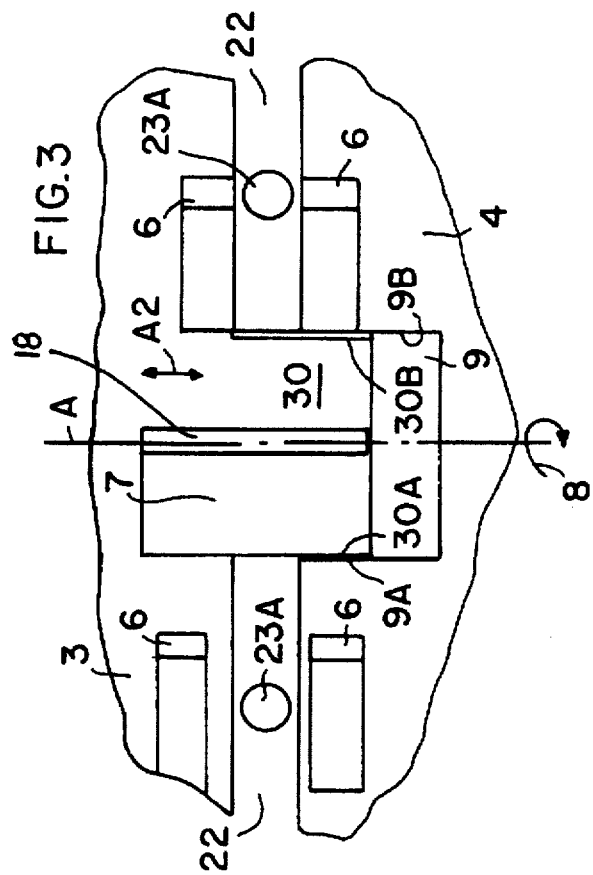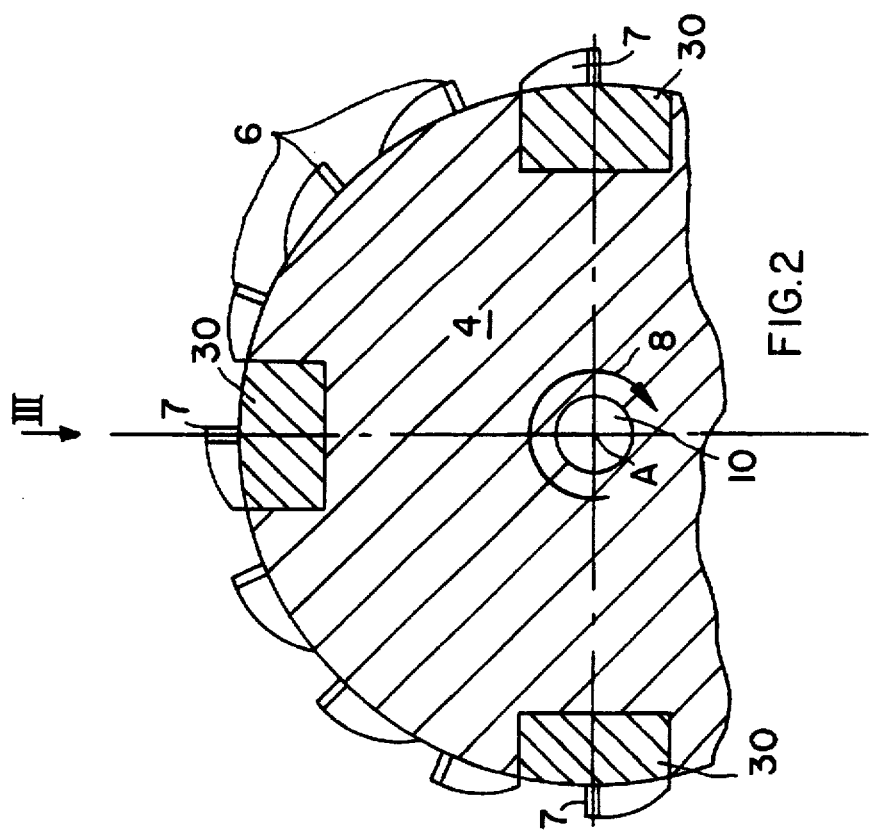

MILLING CUTTER FOR A WHEEL SET MILLING MACHINE

FIELD OF THE INVENTION

The invention relates to a milling cutter for milling or machining of railroad wheel sets on a milling machine tool. Such milling cutters comprise a plurality of cutting elements arranged on a carrier body and distributed around the carrier body in the circumferential direction of the carrier body and in accordance with the railroad profile to be milled. The carrier body is rotatable by a respective rotational drive such as a milling drive shaft. The carrier body is substantially symmetric in a rotational sense relative to a rotation axis of the milling drive shaft.

BACKGROUND INFORMATION

Milling cutters of the type described above are known in the art and have basically proven themselves for reprofiling of worn railroad wheel sets. Conventional milling tools or cutters are constructed to conform as a unit to the entire profile of the wheel to be milled. As a result, conventional milling cutters make it possible to finish the milling of the wheel in a single step provided the wheel profile is shifted exclusively radially toward the rotational axis of the wheel, whereby different milling tools are not necessary. However, such exclusively radial shifting of the wheel set is frequently not sufficient as will be explained in more detail below.

German Patent 489,786 (Schneider et al.) published on Jan. 20, 1930 discloses a divided milling cutter having two half sections that are displaceable in the axial direction. The two cutter half sections (W) are mounted on a drive shaft for rotation with the drive shaft, but permitting an axial displacement of both sections within a limited axial range. The axial displacement is accomplished by a threaded thorn (E) having a conical tip engaging two conical surfaces of cones (K) that in turn engage respective conical surfaces of the two half sections (W). These conical surfaces displace the half sections (W) away from each other against the force of springs (F) which push the two half sections toward each other when the adjustment thorn (E) is moved back.

German Patent Publication 1,179,080 (Föhrer et al.) published on Oct. 1, 1964 discloses a two section milling cutter (42, 46) mounted on a bushing (12) which in turn is mounted on a milling drive shaft (10). The milling width can be axially adjusted by an adjustment screw, whereby a Belleville spring (4) tends to separate the two cutter sections (42, 44) against the adjustment force.

Austrian Patent 167,889 (Kralowetz) published on Mar. 10, 1951 discloses a milling machine tool for round milling of profiled rotational bodies, especially of railroad wheel sets. The cutter has a carrier body (a) that is undivided and driven by a drive shaft (e) operating a worm gear (c, d).

Werkstatt Blatt 462, Carl Hanser Verlag, Munich 1968 discloses various profile milling cutters in FIGS. 21, 22, and 23. FIG. 21 shows four separate milling cutters (2, 3, 4 and 5) mounted on a common drive shaft (6). FIG. 22 shows schematically a gear clutch of a circumferential milling cutter. In FIG. 23 two milling cutter sections are coupled with each other at a slant.

The above described prior art leaves room for improvement, especially if one takes into account the characteristic wear and tear image of railroad wheel sets that require an overhaul. Such characteristic wear and tear image shows that the main wear and tear, namely where most of the wheel material has been removed occurs on the wheel flange flank and in the area of the tread surface next to the wheel flange flank. If such a worn wheel is reprofiled with a profiling milling cutter having a rated profile contour, the reworked wheel circumferential surface or profile contour has merely been displaced radially inwardly relative to the original wheel contour. The radial direction in this context refers to a direction perpendicularly to the rotational axis of the wheel set to be overhauled. As a result, substantial material volumes must be removed even though large wear and tear depths occur only in spots around the wheel circumferential surface and not in the entire wheel surface. The deepest wear and depth thus conventionally controls the milling depth in order to form the rated contour.

Where the cross-section to be milled is smaller in its radial depth than the deepest wear it would appear to be possible to achieve the rated profile at least in the area of the tread and the wheel flange flank by displacing the milling cutter in a direction toward the inner side or face of the wheel parallel to the rotational axis or parallel to the slightly conical tread surface of the wheels of a set. The inner side or face or back face of the wheel is the one that faces the other wheel of a set.

The outer wheel face or front face is facing axially away from the other wheel of a set. Such displacement enables the positioning of the newly to be formed wheel flange "higher" meaning further radially outwardly in the area of the remaining wheel flange of a worn profile. As a result, it would be possible to achieve substantial savings or reductions in the volume of material that has to be machined or milled and thus in the milling time by a relatively small axial shifting or displacement of the profile in the direction of the inner wheel face. Such shifting or displacement within certain limits may be viewed as not being critical for the running characteristic of the wheel set on the rail.

However, a substantial disadvantage is involved with a milling operation based on the just described axial profile shifting of the profiling cutter. This disadvantage is based on the fact that the end portions of the profile contours which do not extend in parallel to the wheel set axis necessarily cause an erroneous milling of the new profile contour of the wheels. Such errors are due to the above mentioned shifting of the milling cutter axially or tangentially to the tread surface of the wheel. The error results in a diameter that is too large on the inside areas of the wheel tread and too small on the outside areas of the wheel tread in which the inner cutting elements of the milling cutter no longer engage the wheel material. It is even possible that a small step is formed along the transition between the inner and outer wheel tread surfaces. If this occurs, a substantial disadvantage results because in order to now achieve the correct transitions of the wheel profile to the side surfaces of the wheel, a further milling operation must be performed with a different milling tool, whereby the overhaul time and respective costs are substantially increased. As a result of this further milling operation, it is also unavoidable to apply a finishing operation to the back face of the wheel flange.

OBJECTS OF THE INVENTION

In view of the above it is the aim of the invention to achieve the following objects singly or in combination:

to provide a milling cutter or tool that will avoid the above disadvantages in a reprofiling operation of railroad wheel sets, more specifically to permit an axial profile change of the tool and thus of the wheel whereby a single milling pass will be sufficient without exchanging milling tools;

generally to reduce the time and respective costs for overhauling railroad wheel sets;

to interconnect a plurality of milling cutter sections in a torque transmitting manner;

to provide for a milling width adjustment by making at least one cutter section axially adjustable relative to a fixed cutter section which is rigidly, for example integrally connected to the torque applying milling shaft;

to assure a more precise adjustment of at least one, preferably two, movable cutter sections relative to a fixed cutter section axially along a milling drive shaft; and to simplify the required adjustments so that the set-up time is reduced while a precision adjustment of the milling width and cutter contour is assured.

SUMMARY OF THE INVENTION

The above objects have been achieved according to the invention by a milling cutter having a carrier body for the cutting elements which carrier body is divided into a plurality of support body sections of which at least one section is axially movable and adjustable relative to a fixed carrier body section, whereby the fixed section can provide a plane of reference for the adjustment of one or more adjustable sections. The adjustment is performed when the cutter is not performing a milling operation.

The movable mounting of at least one cutter section in combination with a fixed mounting of one cutter section has the advantage that the axial adjustment of the movable cutter section prior to a milling operation can take into account any wheel profile displacement that resulted from wear and tear. Normally, such displacement extends inwardly. The amount of displacement of the surface is ascertained and the movable cutter section is adjusted accordingly. Preferably, the adjusted section is that cutter section which mills the back face of the wheel flange. As a result, a single milling run provides a finished overhauled wheel set and a finishing milling operation with a different cutter or tool is no longer necessary according to the invention.

Where the cutter according to the invention is divided in three sections, the adjustable sections are positioned on opposite sides of the fixed section, whereby the respective adjustments can take into account the worn profile condition of the back face and of the front face of the wheel profile. As a result, a single milling operation will provide an overhauled wheel set even if the worn condition of the profile contour requires a milling operation with an axial profile displacement, whereby again time and costs are saved.

According to the invention the milling torque is preferably transmitted from the milling drive shaft directly to the fixed cutter section and through the fixed cutter section indirectly to the adjustable cutter sections either by a friction connection or by an interlocking form-fit or positive connection. These connections for the transmission of the milling torque to the adjustable cutter sections makes it possible to avoid a direct connection between the adjustable cutter sections and the milling drive shaft while permitting the axial adjustment of one or more cutter sections.

BRIEF DESCRIPTION OF THE DRAWINGS

In order that the invention may be clearly understood, it will now be described, by way of example, with reference to the accompanying drawings, wherein:

FIG. 1 is a schematic side view, partially in section of a milling cutter according to the invention having three sections located in a milling position relative to a wheel to be overhauled;

FIG. 2 is a schematic sectional view through a milling cutter according to the invention, whereby the sectional plane passes through a milling cutter section near a neighboring section;

FIG. 3 shows a schematic development providing a top plan view onto two neighboring milling cutter sections coupled to each other by a claw clutch, whereby the view direction is indicated by an arrow III in FIG. 2; and FIG. 4 is a schematic view of an elongated cutting element having a straight cutting contour or edge.

DETAILED DESCRIPTION OF PREFERRED EXAMPLE EMBODIMENTS AND OF THE BEST MODE OF THE INVENTION

FIG. 1 shows a milling cutter 1 according to the invention mounted on a milling drive shaft 10 which in turn is rotatably mounted in bearings 19 of a mounting buck 20 with a buck base 20A slidably supported on guide tracks 34. The mounting buck 20 and the milling cutter 1 form a structural unit that is axially adjustable as indicated by the arrow A5 in the direction of the rotation axis A of the milling drive shaft 10. A conventional adjustment drive 33 such as a power driven spindle 33A permits positioning the structural unit 1, 20 relative to a wheel 28 to be overhauled by a milling operation of the wheel surfaces 11, 12, 13 and 14 of the wheel 28. The milling cutter 1 comprises a carrier body 2 for cutter elements 6 and 7.

According to the invention the carrier body 2 is divided into three carrier body sections 3, 4 and 5 which form respective cutter sections. The cutting elements 6 and 7 are secured to and distributed around these sections in accordance with a rated wheel profile. The milling drive shaft 10 has a power input end 24 that is, for example fluted for coupling to a respective power take-off not shown. The fluted shaft end 24 permits, within certain limits, an axial adjustment in the direction of the arrow A5 as described above. A torque moment 8 applied to the milling drive shaft 10 is directly introduced into the central milling cutter carrier body section 4 which is rigidly connected to the shaft 10. This rigid connection causes the section 4 to rotate with the shaft 10 and prevents any relative displacement between the section 4 and the shaft 10 in the axial direction A5. For this purpose it is preferable but not necessary to construct the section 4 and the shaft 10 as an integral, single piece unit. Instead of an integral construction, a location fit, a form fit, or any other connection suitable for securing the cutter section 4 in a force transmitting manner to the drive shaft 10 may be used. Thus, the torque moment 8 is directly introduced into the section 4 through the shaft 10. However, the separate carrier body sections 3 and 5 are axially displaceable on the shaft 10 relative to the center section 4 as indicated by the arrows A1 and A2, whereby the axially facing end faces of the section 4 provide reference planes for the axial adjustment of the sections 3 and 5 to thereby leave a defined width for a gap 22 after adjusting the axial position of the sections 3 and 5 toward and away from the section 4. An axial adjustment device 31 for axially displacing the carrier sections 3 and 5 as indicated by the arrows A1 and A2 will be described in more detail below. The torque moment 8 is transmitted from the central section 4 to the adjustable sections 3 and 5 through a respective coupling, for example, a claw clutch 9, 30 or any suitable drive coupling such as a friction coupling, a form-locking coupling, or the like. Further details of the claw coupling will be described below with reference to FIG. 3.

FIG. 1 further shows a wheel guide roller 26 rotatably mounted on a vertical axle 26A for contacting an outer wheel face 13 to thereby properly position the structural unit 1, 20 axially relative to the wheel 28. The roller 26 with its axle 26A is mounted on a block 26B which can be moved e.g. by means of a hydraulic cyclinder to either a retracted position or to the position where the block 26B contacts an axially facing surface of the carrier body section 3 when the cutter does not rotate. In this latter position the positioning of the cutter relative to the wheel to be milled will take place. Instead of positioning the guide roller 26 on the right-hand side as shown, it may also be positioned on the left hand side to thereby contact the inner wheel face 29 of the wheel 28. In that case the block 26B would be adjustably mounted on the cutter section 5.

Alternatively, the unit 1, 20 may be mechanically coupled to wheel support and/or wheel drive rollers which guide the wheel 28 in the radial as well as in the axial direction. Such a coupling between the unit 1, 20 end the just mentioned guide and/or drive rollers for the wheel 28 also permits an exact axial positioning or locating of the milling cutter 1 relative to the wheel 28 that is to be overhauled, for example by the above mentioned axial adjustment drive 33.

In both possible adjustments of the cutter 1 relative to the wheel 28, the adjustment will be made prior to a milling operation depending on the worn profile contour of the wheel to be overhauled in such a way that material volume to be milled off is minimized. This minimal material volume must, however, be sufficient for restoring a rated profile in the area of the tread surface 11 and in the area of the wheel flange flank 12. The axial displacement of the cutter 1 for this purpose, namely to reduce the volume of material to be removed, is further limited by the requirements that must be met by the restored wheels, namely to have the required good running characteristics and the required high operational safety. For example, if the cutter section 4, the cutting elements 6 of which mill the tread surface 11, is brought into a position that corresponds to the maximally tolerable amount of profile displacement radially inwardly, it is then necessary that the sections 3 and 5 are displaced outwardly by a respective value in order to achieve a required configuration of the transitions of the profile from the tread surface 11 into the wheel side surfaces 13 and 29 including the wheel flange flank faces 12 and 14.

The sections 3 and 4 are coupled to each other through, for example four push/pull rods 21 passing through bores 27 in the central fixed section 4. The milling operation of the section 3 mills the outer face 13 of the wheel 28. The section 5 mills the back flank face 14 that merges into the back side or face 29 of the wheel flange 29A of the wheel 28. Due to the coupling by the push/pull rods 21 rigidly connected to both sections 3 and 5, it is merely necessary to adjust one of the segments 3 or 5 in the axial direction A5, whereby the respective other section follows the adjustment in synchronism.

FIG. 1 shows, for example how the section 3 is adjusted by an adjustment sleeve 31 having an inner threading 31A engaging an outer threading 3A of the section 3. A gap G between the sleeve 31 and the section 3 provide the required adjustment range. The rotatably mounted adjustment sleeve 31 can itself not move axially due to a ring disk 32 rigidly secured to the milling drive shaft 10, for example, by a shrink fit. The adjustment sleeve 31 is preferably provided with a gear rim 35A cooperating with a gear drive 35 for the axial adjustment indicated by the arrows A1 and A2 by the engagement of the threads 31A and 3A. The gear drive 35 may be manually operated by a crank or it may be automatically driven by a respective motor not shown. The crank or motor would be connected to the drive stub 35B. In both instances the rotation of the stub 35B in one direction will narrow the gap 22 and rotation in the opposite direction will widen the gap 22 and a stepless adjustment of the gap G is achieved due to said threadings 3A, 31A cooperating with each other.

Referring further to FIG. 1, three milling ranges 15, 16 and 17 are shown symbolically. These milling ranges correspond to the respective sections 3, 4 and 5 of the cutter 1. Overlap ranges OR are provided between the axially adjustable sections 3 and 5 on the one hand and the fixed section 4 on the other hand. Cutting elements 6 are secured to the surfaces of the carrier body sections, whereby in the entire milling range 16 the cutting elements are preferably circular cutting plates. The milling range 16 covers the tread surface 11 and the outwardly facing face 12 of the wheel flange 29A. These cutting plates for circular cutting assure the highest milling quality. Further cutting elements 7 are secured in the transition areas across gaps 22 between the flange flank surfaces 12 and 14 and between tread surfaces 11 and 13. These cutting elements 7 have a straight or linear cutting edge 18 as shown in FIG. 4. With the help of these linear cutting elements 7 a larger adjustment range may be realized since these cutting elements bridge the gap 22 between the sections 4 and 5 as well as between the sections 4 and 3.

FIG. 2 shows the arrangement of the cutting elements 6 and 7 on the carrier body section 4. The elements 7 are positioned where the claws 30 of the claw clutch 9 are connected to the section 4, for example four of such claws 30 are spaced at 90° intervals. The cutting elements 6 are preferably round cutting plates facing in the cutting direction indicated by the arrow 8 representing the torque applied to the shaft 10.

Referring further to FIG. 1, a duct 25 for cooling fluid passes coaxially with the longitudinal rotational axis A of the milling drive shaft 10 through the shaft 10 to such an extent that branching channels 23 connect the duct 25 to fluid discharge ports 23A, visible in FIG. 3, for feeding cooling and chip removing fluid A3 into the gaps 22. As shown, the duct 25 has an inlet opening 23' at the power input end 24 of the shaft 10. However, the duct 25 could similarly have its input end at the opposite end of the shaft 10. Compressed air or other fluid may be pumped through the duct 25 and its branching channels 23. Such fluid supply has the advantage that the areas being milled are kept free of milling chips which are removed by the fluid out of the gaps 22 so that an axial adjustment of the sections 3 and 5 is not hampered by any milling chips in the gaps 22. Additionally, a certain cooling effect is achieved. By keeping the gaps 22 free of milling chips, the adjustment of the sections 3 and 5 for another wheel can be made without any intermediate cleaning operation.

FIG. 3 shows the engagement of the claws 30 of the carrier body section 3 into meshing recesses 9 of the central carrier body section 4 to form the above mentioned claw clutch 9, 30. When the torque moment 8 is applied to the central section 4 a recess edge 9A engages a claw edge 30A to thereby entrain the section 3 with the rotation of the section 4. A meshing engagement is also provided between the edges 30B and 9B. The cutting element 7 with its straight edge 18 overlaps the gap 22 and reaches to the end of the claw 30 as shown in FIG. 3. The side channel openings 23A open in the gap 22 as mentioned above. A gap is provided between the downwardly facing edge of the claw 30 and the upwardly facing wall of the meshing recess 9 in sections 3 and 5 to permit the axial adjustment of the sections 3 and 5 relative to the section 4 which provides a reference plane for the axial adjustment in the direction of the arrows A1 and A2 shown in FIG. 1. This arrangement of the claw 30 and the cutting element 7 provides for a substantial adjustment range of the sections 3 and 5 relative to fixed section 4.

Referring to FIGS. 2 and 3 in conjunction, the arrangement of the elongated cutting elements 7 on the claws 30 provides straight cutting edges 18 in the transition area between the axially adjustable sections 3 and 5 on the one hand and the fixed section 4 on the other hand, whereby the cutting elements 7 bridge the gaps 22. This arrangement of the cutting elements 7 in the transition areas provides a high milling precision in these transition areas between the tread surface 11 and the wheel flange flank 12 and between tread surface 11 and end surface 13, even though the spacing angularly in the circumferential direction between the cutting edges 18 is larger than a respective spacing between cutting edges of cutting elements 6.

The transmission of the torque 8 from the central section 4 to the sections 3 and 5 can be performed by any suitable coupling. However, the claw clutch with its recesses 9 and claws 30 is preferred because it is a simple, yet very efficient coupling that has the required small play to assure the precision milling while transmitting the required torque moments without any problems.

The preferred embodiment in which the milling drive shaft 10 and the central cutter section 4 form an integral component, has the advantage that large torque moments can be transmitted without the danger of an overload. Further, any deformations caused by the torque load transmission are minimal, whereby highest precision milling operations can be performed in order to restore or mill a railroad wheel surface to the required rated contour.

The embodiment with three cutting sections 3, 4 and 5 in which the central section 4 is rigidly secured to the milling drive shaft 10 between the two other axially shiftable elements 3 and 5 has the advantage that a high milling precision is assured in the transition areas between the tread surface 11 and the flank surface 12 where that precision is necessary for the running qualities of the wheel. In areas where the precision requirement is not quite as high, namely on the back flank surface 14 and the front flank surface 13, these last mentioned surface areas 14 and 13 can be milled by an axial displacement of the sections 3 and 5. These axial displacements permit milling the entire wheel with a single tool in a single milling pass, without any finishing milling operation with different tools. Nevertheless, a correctly formed or restored profile is achieved on the inwardly toward the outer wheel facing side or flank 14 and on the outwardly facing side or flank surface 13, including rated profile transitions between these surfaces and the tread surface 11.

By coupling the outer sections 3 and 5 to each other through a push-pull rod 21, the invention achieves the advantage that a synchronized adjustment of these sections in the axial direction is achieved by rotating one or the other section 3 or 5. As a result, the proper position of both sections 3 and 5 relative to the central section 4 is automatically assured. The use of, for example, four coupling rods 21 that pass through bores 27 in the section 4 parallel to the longitudinal axis A provides a practical and robust coupling of the two lateral sections 3 and 5 which are separated by the central section 4 and the gaps 22.

By mounting the cutting elements 7 in such a way that the cutting range of the cutting element 7 partially overlaps the cutting range of the other cutting elements 6 as shown at OR for the cutting ranges 15, 16, and 17 in FIG. 1, the invention achieves the advantage that at least one or two of the axially movable sections 3, 5 can be adjusted without the need for inserting additional cutting elements if the gap 22 is enlarged. Similarly, when the gap 22 is made smaller, it is also not necessary to remove cutting elements. As a result, the set-up time is substantially reduced. By providing the overlapping cutting element 7 with a straight cutting edge 18 as compared to a circular or curved cutting edge for the cutting element 6, the invention achieves a relatively large axial adjustment range for the two sections 3 and 5 while nevertheless assuring a milling without any transition marks between neighboring milling ranges or areas 15, 16 and 17 and the overlapping range OR may be rather substantial.

By mounting the milling drive shaft 10 with its bearings 19 in a bearing buck 20, the invention provides an easily exchangeable structural cutting unit that may be quickly replaced in the milling machine by a corresponding structural unit so that servicing of one structural cutting unit can be performed while the milling machine continues to work with an other cutting unit. Actual down times are thereby minimized. Another advantage of mounting the milling shaft with its cutters as taught herein at both ends relatively close to the cutter sections 3, 5, assures a mounting of the cutter head 1 in a bending stiff manner, whereby vibrations are minimized and a precision milling operation is assured.

Further, by making the entire structural unit 1, 10, 20 axially displaceable, for example on slide guide rails 34, an axial adjustment is possible in combination with a compact construction of the bearing unit. This feature also has the advantage that an axial adjustment of the bearings themselves is no longer necessary.

The provision of the flow channel or duct 25 coaxially inside the milling drive shaft 10 in combination with the radially extending ducts 23, permits an efficient supply of cleaning and cooling fluid into the gaps 22 between neighboring sections 3, 4 and 4, 5. The fluid is, for example, compressed air which makes sure that any cutting chips are removed from the gaps 22 and the adjustment of the sections 3 and 5 relative to the section 4 can be performed at any time without a special separate cleaning operation. This feature further reduces the set-up time.

Further, the guide roller 26 makes sure that a safe and exact guiding of the milling cutter 1 relative to a reference plane is achieved for milling the wheel surfaces 11, 12, 13 and 14.

The embodiment of the invention wherein the structural unit 1, 10 and 20 is mechanically coupled with support and/or drive rollers for the wheel 28 to be trued, permits an adjustment of the structural unit relative to the wheel 28 independently of the coupling. In this embodiment it is advantageous that the support and/or drive rollers of the wheel 28 to be trued provide reference points, whereby such points at one wheel of a set are sufficient to precisely mill both wheels of a set. Thus, the guide function of the guide and/or drive wheels for the wheel to be trued is advantageously also used for the positioning of the structural unit 1, 10, and 20.

Although the invention has been described with reference to specific example embodiments, it will be appreciated that it is intended to cover all modifications and equivalents within the scope of the appended claims.

What is claimed is:

1. A rail wheel milling cutter comprising a milling drive shaft (10), a plurality of carrier body sections (3, 4, 5) connected to said milling drive shaft (10) so as to be rotatable by said milling drive shaft (10), cutting elements (6, 7) secured to said carrier body sections for said milling, wherein at least one first carrier body section (4) of said carrier body sections is directly and rigidly connected with said milling drive shaft (10) for a direct torque application to said first carrier body section (4), wherein at least one second carrier body section (3 or 5) is mounted for axial displacement relative to said milling drive shaft (10) and relative to said first carrier body section (4) whereby a gap (22) is formed between said first end second carrier body sections, and wherein an adjustment member (31, 31A, 3A) is connected to said second carrier body section (3 or 5) for a stepless axial displacement of said second carrier body section (3 or 5) relative to said first carrier body section (4) into a fixed cutting position along said drive shaft (10) by adjusting a width of said gap (22) when said drive shaft is not operating, further comprising a guide roller coupled to said milling cutter in a position for engaging a side face of a wheel to be milled, and a drive connected to said guide roller for positioning said guide roller against a reference face of a wheel to be milled when the milling cutter does not rotate.

2. The milling cutter of claim 1, further comprising a torque transmitting coupling (9, 30) between two neighboring carrier body sections of said plurality of carrier body sections.

3. The milling cutter of claim 2, wherein said torque transmitting coupling comprises a claw clutch (9, 30) operatively interposed between said first carrier body section (4) and said second carrier body section (3 or 5) forming said neighboring carrier body sections so that said second carrier body section is driven through said first carrier body section and said first carrier body section is directly driven by said milling drive shaft (10).

4. The milling cutter of claim 1, comprising at least three carrier body sections (3, 4, 5), wherein said first carrier body section (4) forms an integral one piece component with said milling drive shaft (10) and is positioned between two axially displaceable second carrier body sections (3 and 5) mounted on said milling drive shaft (10) for said axial displacement toward and away from said first carrier body section (4).

5. The milling cutter of claim 4, further comprising an axial displacement transmitting coupling (21) between said two second carrier body sections (3, 5) so that an axial adjustment of one (3) of said two second carrier body sections is transmitted to the other second carrier body section (5) and vice versa, whereby both second carrier body sections (3, 5) are axially displaced in synchronism with each other.

6. The milling cutter of claim 5, wherein said axial displacement transmitting coupling is a push-pull rod (21) rigidly connected to both second carrier body sections.

7. The milling cutter of claim 1, wherein said cutting elements (7) have an overlapping cutting range comprising a linear or straight cutting contour (18).

8. The milling cutter of claim 1, further comprising a mounting buck (20) with at least two bearings (19), said milling drive shaft (10) carrying said carrier body sections (3, 4, 5) being rotatably mounted in said bearings (19) of said mounting buck (20) so that said carrier body sections are positioned between said at least two bearings.

9. The milling cutter of claim 8, further comprising a positioning device (33, 34) cooperating with said mounting buck (20) for axially moving and adjusting said mounting buck (20) with its milling cutter (1) relative to a position of a rail wheel set to be milled.

10. The milling cutter of claim 8, wherein said mounting buck (20) with said milling drive shaft (10) and said carrier body sections (3, 4, 5) mounted on said milling drive shaft form a structural component that is exchangeable as a unit.

11. The milling cutter of claim 1, wherein said milling drive shaft (10) comprises a fluid duct (23, 23', 25) leading from an end of said milling shaft into said gap (22) for feeding a cooling fluid into said gap (22).

12. The milling cutter of claim 11, wherein said end of said milling drive shaft (10) is a torque power input end with a fluted shaft end (24).

13. The milling cutter of claim 1, further comprising a mounting buck (20) with bearings (19) rotatably supporting said milling cutter (1) to form a structural unit adapted to be mechanically coupled to at least one wheel set guide roller (26), and wherein said structural unit is position adjustable relative to said at least one wheel set guide roller.

14. The milling cutter of claim 13, wherein said at least one wheel set guide roller (26) is also a driver roller.

15. The milling cutter of claim 1, wherein said cutting elements (6, 7) are secured to said carrier body sections so that at least a portion of at least one cutting element (7) has an overlapping cutting range that overlaps at least partly a cutting range of other cutting elements (6) on its carrier body (3) and extends across said gap (22) and at least partly into a cutting range of cutting elements (6) secured to a neighboring carrier body section (4), wherein cutting ranges (15, 16 17) of neighboring carrier body sections overlap (OR) each other at least partly in different axial positions of said neighboring carrier body sections (3, 4, 5).

16. A milling cutter for milling rail wheel sets, comprising a milling drive shaft (10), a plurality of carrier body sections (3, 4, 5) connected to said milling drive shaft (10) so as to be rotatable by said milling drive shaft (10), cutting elements (6, 7) secured to said carrier body sections for said milling, wherein at least one first carrier body section (4) of said carrier body sections is directly and rigidly connected with said milling drive shaft (10) for a direct torque application to said first carrier body section (4), wherein at least two second carrier body sections (3 and 5) are mounted for axial displacement relative to said milling drive shaft (10) and relative to said first carrier body section (4) whereby a gap (22) is formed between said first and second carrier body sections, and wherein an adjustment member (31, 31A, 3A) is connected to one of said second carrier body sections (3 or 5) for an axial displacement of said second carrier body sections (3 and 5) relative to said first carrier body section (4) into a fixed position for cutting by adjusting a width of said gap (22), said milling cutter further comprising an axial displacement transmitting coupling (21) between said two second carrier body sections (3 and 5) so that an axial adjustment of one (3) of said two second carrier body sections is transmitted to the other second carrier body section (5) and vice versa, whereby both second carrier body sections (3, 5) are axially displaced in synchronism with each other.

17. A milling cutter for milling rail wheel sets, comprising a milling drive shaft (10), a plurality of carrier body sections (3, 4, 5) connected to said milling drive shaft (10) so as to be rotatable by said milling drive shaft (10), cutting elements (6, 7) secured to said carrier body sections for said milling, wherein at least one first carrier body section (4) of said carrier body sections is directly and rigidly connected with said milling drive shaft (10) for a direct torque application to said first carrier body section (4), wherein at least one second carrier body section (3 or 5) is mounted for axial displacement relative to said milling drive shaft (10) and relative to said first carrier body section (4) whereby a gap (22) is formed between said first and second carrier body sections, and wherein an adjustment member (31, 31A, 3A) is connected to said second carrier body section (3 or 5) for an axial displacement of said second carrier body section (3 or 5) relative to said first carrier body section (4) into a fixed position for cutting by adjusting a width of said gap (22), further comprising a guide roller (26) coupled to said milling cutter (1) in a position for engaging a side face (13 or 29) of a wheel (28) of said wheel set to be milled, and a hydraulic drive connected to said guide roller (26) for hydraulically positioning said guide roller against a reference face of a wheel (28) to be milled when the milling cutter does not rotate.

* * * * *

UNITED STATES PATENT AND TRADEMARK OFFICE
CERTIFICATE OF CORRECTION

PATENT NO. : 5,678,966
DATED : Oct. 21, 1997
INVENTOR(S) : Heimann

It is certified that error appears in the above-identified patent and that said Letters Patent is hereby corrected as shown below:

| Col 1, | line 31, | replace "Jan. 20, 1930" by --Jan. 2, 1930--; |
| | line 48, | replace "(4)" by --(48)--; |
| Col. 5, | line 10, | replace "left hand" by --left-hand--; |
| | line 17, | replace "end" by --and--; |
| Col. 9, | line 8, | replace "end" by --and--; |
| Col. 10, | line 26, | replace "16 17)" by --16, 17)--. |

Signed and Sealed this

Sixth Day of January, 1998

Attest:

BRUCE LEHMAN

*Attesting Officer*    Commissioner of Patents and Trademarks